United States Patent
Isobe et al.

(10) Patent No.: US 10,144,832 B2
(45) Date of Patent: Dec. 4, 2018

(54) BLACK FINE PARTICULATE NEAR-INFRARED REFLECTIVE MATERIAL, METHOD FOR MANUFACTURING SAME, AND USAGE FOR SAME

(71) Applicant: Ishihara Sangyo Kaisha, Ltd., Osaka (JP)

(72) Inventors: Kaoru Isobe, Yokkaichi (JP); Norihiko Sanefuji, Yokkaichi (JP); Kenji Kataoka, Yokkaichi (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 169 days.

(21) Appl. No.: 15/100,166

(22) PCT Filed: Nov. 27, 2014

(86) PCT No.: PCT/JP2014/081422
§ 371 (c)(1),
(2) Date: May 27, 2016

(87) PCT Pub. No.: WO2015/080214
PCT Pub. Date: Jun. 4, 2015

(65) Prior Publication Data
US 2017/0029627 A1  Feb. 2, 2017

(30) Foreign Application Priority Data
Nov. 29, 2013 (JP) ................. 2013-247165

(51) Int. Cl.
*C09D 5/33* (2006.01)
*C01G 45/00* (2006.01)
(Continued)

(52) U.S. Cl.
CPC .......... *C09D 5/004* (2013.01); *C01G 23/006* (2013.01); *C01G 45/00* (2013.01); *C01G 45/125* (2013.01); *C09D 1/00* (2013.01); *C09D 7/40* (2018.01); *C09D 7/61* (2018.01); *C01P 2002/34* (2013.01); *C01P 2002/72* (2013.01); *C01P 2004/03* (2013.01); *C01P 2004/62* (2013.01);
(Continued)

(58) Field of Classification Search
CPC ....................................... G02B 5/26
USPC ....................................... 252/587
See application file for complete search history.

(56) References Cited

U.S. PATENT DOCUMENTS 8,034,250 B2 * 10/2011 Hayashi ............... C01G 23/003
                                                      252/62.9 PZ
2011/0068308 A1    3/2011 Takaoka et al.

FOREIGN PATENT DOCUMENTS

EP          2500317 A1    9/2017
JP     2009/107919 A      5/2009
(Continued)

*Primary Examiner* — Khanh T Nguyen
(74) *Attorney, Agent, or Firm* — Jeffrey S. Melcher; Manelli Selter PLLC

(57) ABSTRACT

Provided is a black fine particulate near-infrared reflective material which is a perovskite-type complex oxide containing at least an alkaline earth metal element, titanium element, and manganese element, having a BET specific surface area within a range of 3.0-150 $m^2/g$. The Hunter L value, as an indicator of blackness, is 30 or less, and the reflectivity at a wavelength of 1200 nm, as an indicator of near-infrared reflective power, is 40% or above.

15 Claims, 5 Drawing Sheets

(51) Int. Cl.
   *C01G 23/00*   (2006.01)
   *C01G 45/12*   (2006.01)
   *C09D 1/00*    (2006.01)
   *C09D 7/40*    (2018.01)
   *C09D 7/61*    (2018.01)

(52) U.S. Cl.
   CPC ...... *C01P 2004/64* (2013.01); *C01P 2004/82* (2013.01); *C01P 2006/12* (2013.01); *C01P 2006/62* (2013.01); *C01P 2006/63* (2013.01); *C01P 2006/66* (2013.01); *C01P 2006/80* (2013.01)

(56) References Cited

FOREIGN PATENT DOCUMENTS

| | | | | |
|---|---|---|---|---|
| JP | 2010/202489 | | 9/2010 | |
| JP | 2011/94086 | A1 | 5/2011 | |
| JP | 2013-224433 | * | 10/2013 | ............... C09K 3/00 |
| WO | WO2009/142254 | A1 | 11/2009 | |
| WO | WO2013/115183 | A1 | 8/2013 | |

* cited by examiner

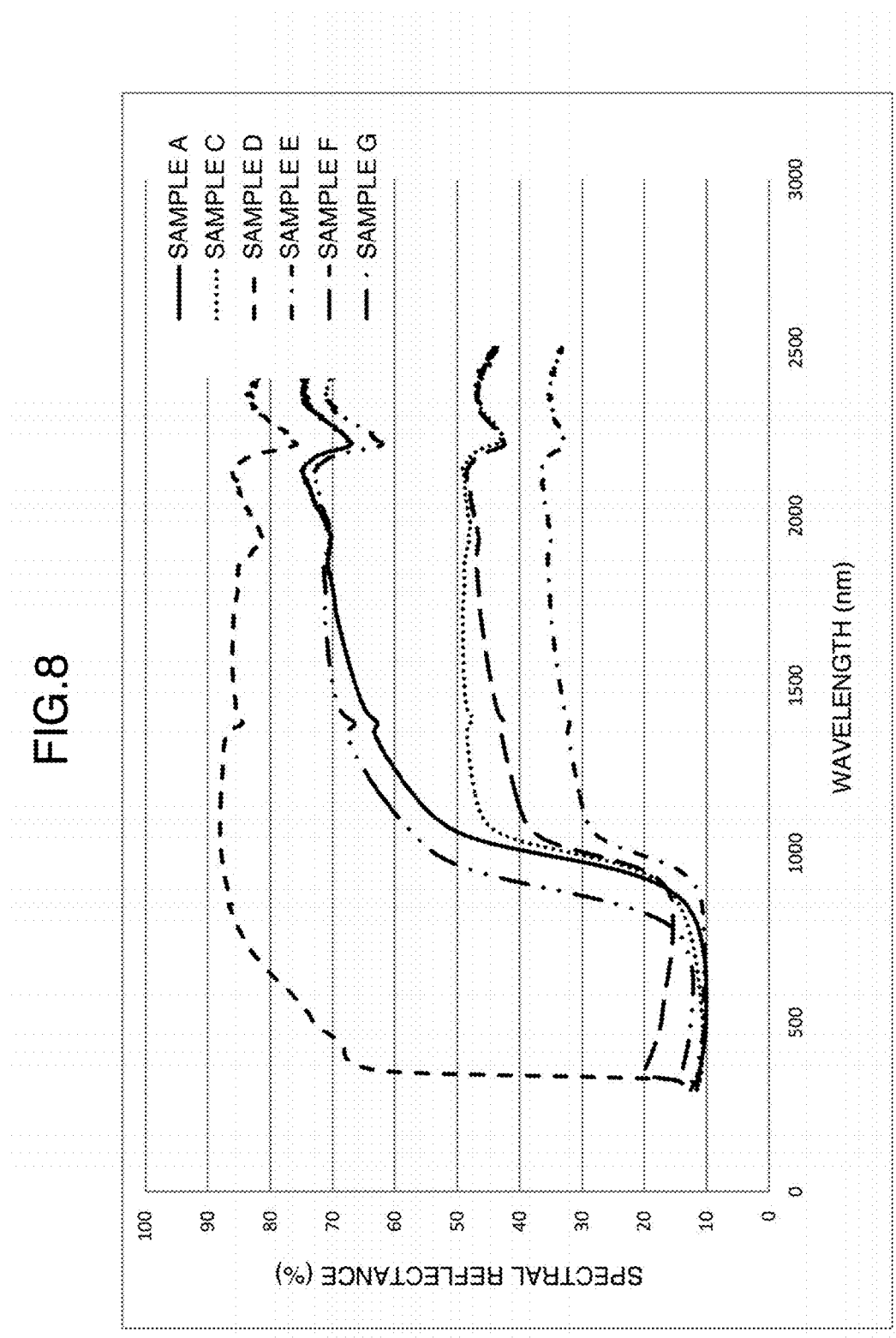

BLACK FINE PARTICULATE NEAR-INFRARED REFLECTIVE MATERIAL, METHOD FOR MANUFACTURING SAME, AND USAGE FOR SAME

This application is the national phase of international application PCT/JP2014/081422 filed 27 Nov. 2014 which designated the U.S.

TECHNICAL FIELD

The present invention relates to a black fine particulate near-infrared reflective material and a method for manufacturing the same. The present invention also relates to a solvent dispersion, a coating material, a resin composition, and a fiber composition, including the same, and additionally relates to an infrared reflector in which the coating material is used.

BACKGROUND ART

Near-infrared reflective materials are materials that reflect near-infrared rays included in sunlight or the like. The near-infrared reflective materials can reduce the amount of infrared rays absorbed by a ground surface covered with asphalt, concrete or the like, buildings and the like, and thus the near-infrared reflective materials are used for relaxation of the heat island phenomenon, an increase in air conditioning efficiency of buildings in the summer and the like. Specifically, the coating material including the near-infrared reflective materials is used by being applied on a base material, by being kneaded in a resin and molded, by being kneaded when spun into fiber, or by being fixed onto the surface of spun yarn. The hues of the near-infrared reflective materials include white, black, and chromatic colors. A perovskite type composite oxide including at least an alkaline earth metal element, a titanium element, and a manganese element is known as the black near-infrared reflective material, and the facts that manganese-containing calcium titanate is black and furthermore has excellent near-infrared reflectivity are disclosed (see Patent Literature 1).

CITATION LIST

Patent Literature

Patent Literature 1: JP 2010-202489 A

SUMMARY OF INVENTION

Technical Problem

The above manganese-containing calcium titanate is specifically described in Examples 10 to 16 of Patent Literature 1, and each raw material is fired at 1400° C. to manufacture a material having a specific surface area of 0.32 to 1.54 m$^2$/g and an average particle size, which is calculated from the value of the specific surface area, of 0.86 to 4.25 μm. Although these materials are black and have excellent near-infrared reflectivity, the materials do not have sufficient hiding power and tinting strength due to their particle size of 0.8 μm or more. Additionally, when applied or fixed on a base material and the like, hiding of the base is not sufficient, and the tinting strength is not sufficient. For these reasons, the improvements have been desired.

Solution to Problem

As a result of the various studies, the present inventors have found that at least an alkaline earth metal compound, a titanium compound, and a manganese compound are mixed while being strongly grinded, preferably by means of a wet grinder, and fired at a relatively low temperature of 800 to 1100° C., thereby reducing the unreacted residue of the raw material and diminishing the redness tone, even when the solid phase reaction described above is performed at a low temperature. Additionally, the present inventors have found that the suppression of particle growth due to the solid phase reaction at a low temperature enables particles to be micronized, thereby improving the hiding power and the tinting strength, and so on. As a result, the present inventors have completed the present invention.

Namely, the present invention includes the following embodiments (1) to (17).

(1) A black fine particulate near-infrared reflective material is a perovskite type composite oxide comprising at least an alkaline earth metal element, a titanium element, and a manganese element, which has a powder BET specific surface area in the range of 3.0 to 150 m$^2$/g, a Hunter L value of 30 or less, and a reflectance of 40% or more at a wavelength of 1200 nm. This black fine particulate near-infrared reflective material has excellent hiding power and tinting strength.

(2) The black fine particulate near-infrared reflective material according to (1) has a particle size in the range of 0.01 to 0.49 μm. This black fine particulate near-infrared reflective material has excellent hiding power and tinting strength.

(3) The BET specific surface area of the black fine particulate near-infrared reflective material according to (1) or (2) is preferably in the range of 3.0 to 50 m$^2$/g, more preferably in the range of 3.0 to 25 m$^2$/g.

(4) The reflectance at a wavelength of 1200 nm of the black fine particulate near-infrared reflective material according to any one of (1) to (3) is preferably 45% or more, more preferably 50% or more, and still more preferably 52% or more.

(5) The black fine particulate near-infrared reflective material according to any one of (1) to (4) comprises at least two or more compounds selected from an alkaline earth metal titanate compound, an alkaline earth metal manganate compound, and an alkaline earth metal titanate manganate compound. This black fine particulate near-infrared reflective material has excellent hiding power and tinting strength.

(6) The black fine particulate near-infrared reflective material according to (5) preferably comprises an alkaline earth metal titanate compound and an alkaline earth metal titanate manganate compound.

(7) The black fine particulate near-infrared reflective material according to any one of (1) to (6) is represented by the composition formula xAeTiO$_{3-\gamma}$·yAe'MnO$_{3-\gamma}$·zAe''(Ti$_\alpha$Mn$_\beta$)O$_{3-\gamma}$, wherein Ae, Ae', and Ae'' are each at least one alkaline earth metal element selected from magnesium, calcium, strontium, and barium, and may be the same or different from each other; Ti represents a titanium element, Mn represents a manganese element, and O represents an oxygen element; x, y, and z are real numbers, 0≤x<1, 0≤y<1, 0≤z≤1, and x+y+z=1; α and β are real numbers, 0<α<1, 0<β<1, and α+β=1; and γ is a real number and 0≤γ<3. This black fine particulate near-infrared reflective material has excellent hiding power and tinting strength.

(8) The compound represented by the composition formula xAeTiO$_{3-\gamma}$·zAe''(Ti$_\alpha$Mn$_\beta$)O$_{3-\gamma}$, which is the composition formula according to (7) with y=0, is preferable.

(9) The black fine particulate near-infrared reflective material according to any one of (1) to (8) further comprises a Group 13 element in the periodic table. This black fine particulate near-infrared reflective material has excellent hiding power and tinting strength.

(10) A method for manufacturing the black fine particulate near infrared reflective material according to any one of (1) to (8) comprises mixing at least an alkaline earth metal compound, a titanium compound and a manganese compound with a wet grinder, and firing the mixture at 800 to 1100° C.

(11) In the case of manufacturing the black fine particulate near-infrared reflective material according to (9), at least an alkaline earth metal compound, a titanium compound, a manganese compound, and additionally a Group 13 element in the periodic table are preferably mixed by means of a wet grinder before fired at a temperature of 800 to 1100° C.

(12) The wet grinder used in (10) or (11) more preferably includes a media.

(13) A solvent dispersion comprises the black fine particulate near-infrared reflective material according to any one of (1) to (9).

(14) A coating material comprises the black fine particulate near-infrared reflective material according to any one of (1) to (9).

(15) A resin composition comprises the black fine particulate near-infrared reflective material according to any one of (1) to (9).

(16) A fiber composition comprises the black fine particulate near-infrared reflective material according to any one of (1) to (9).

(17) An infrared reflector comprises a base material on which the coating material according to (14) is applied.

Advantageous Effects of Invention

The near-infrared reflective material according to the present invention is a black fine particulate near-infrared reflective material of a perovskite type composite oxide including at least an alkaline earth metal element, a titanium element, and a manganese element. The material has sufficient blackness and near-infrared reflectivity, as well as has excellent hiding power and tinting strength because of being fine particulate. Thus, the near-infrared reflective material can be used by being applied on, fixed on, or kneaded into a base material and the like. Therefore, the near-infrared reflectivity can be imparted to a coating film, a plastic, a fiber and the like, and further the base can be hided and tinted.

Additionally, according to the manufacturing method of the present invention, at least an alkaline earth metal compound, a titanium compound, a manganese compound and the like are mixed while being strongly grinded, preferably by means of a wet grinder. As a result, the unreacted residue of the raw material can be reduced even if firing is performed at a low temperature, and the black fine particulate near-infrared reflective material can be easily manufactured.

BRIEF DESCRIPTION OF DRAWINGS

FIG. 8 is a graph showing the spectral reflectance of the powder of Samples A, C, D to G obtained in Examples and Comparative Examples.

DESCRIPTION OF EMBODIMENTS

Figure 1:
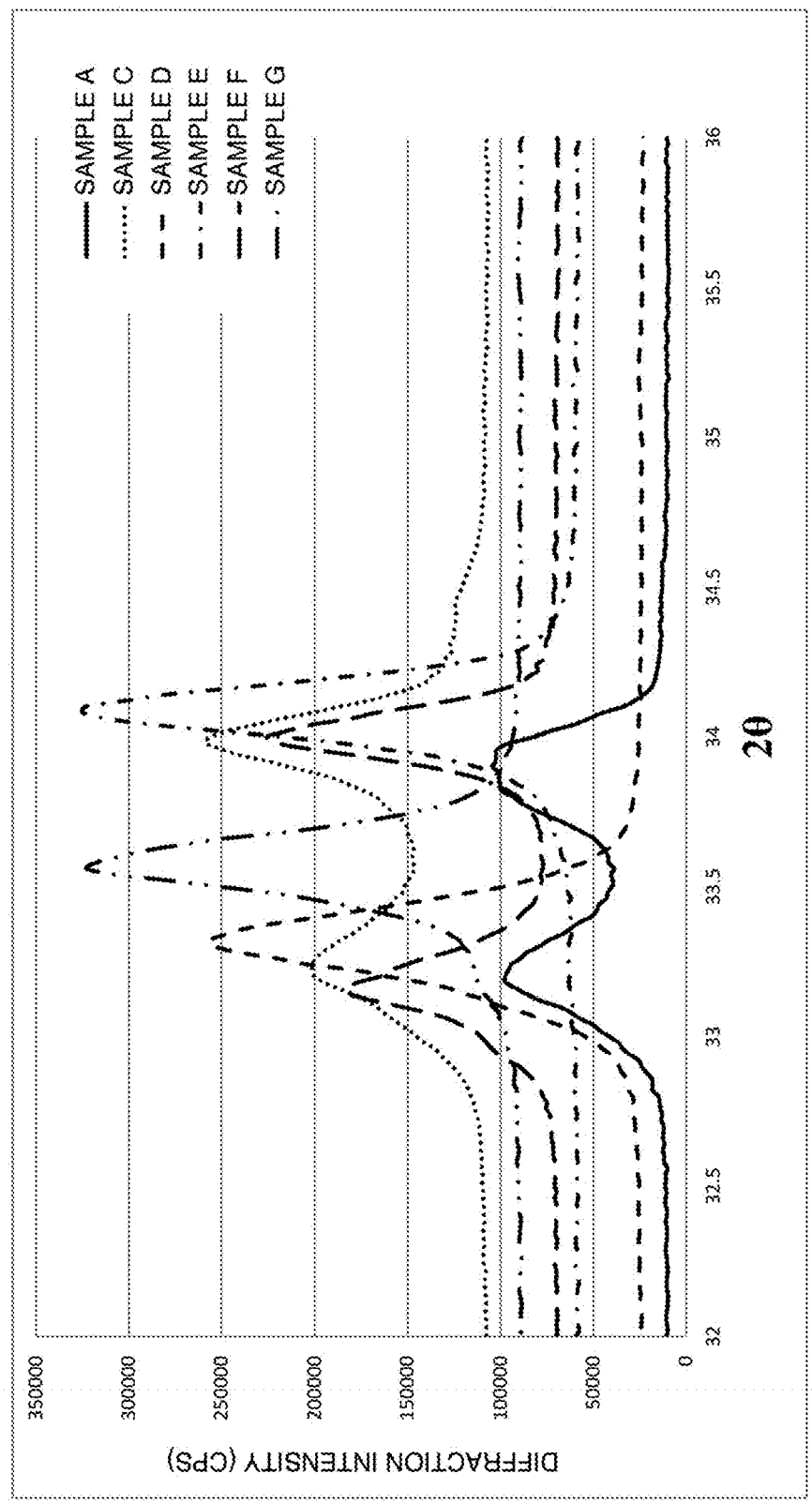
FIG. 1 is a powder X-ray diffraction chart of Samples A, C, D to G obtained in Examples and Comparative Examples.
Figure 2:
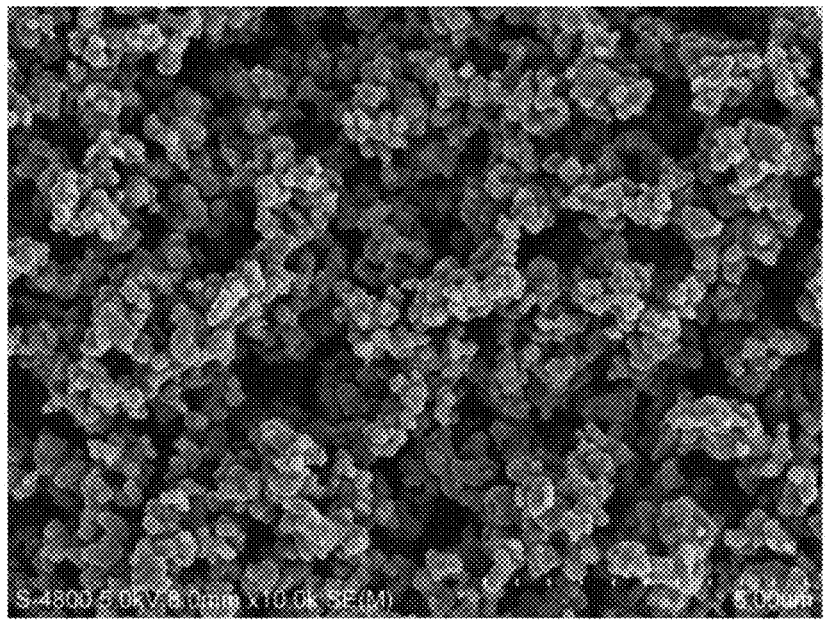
FIG. 2 is an electron micrograph showing the particle shape of Sample A obtained in Example 1.
Figure 3:
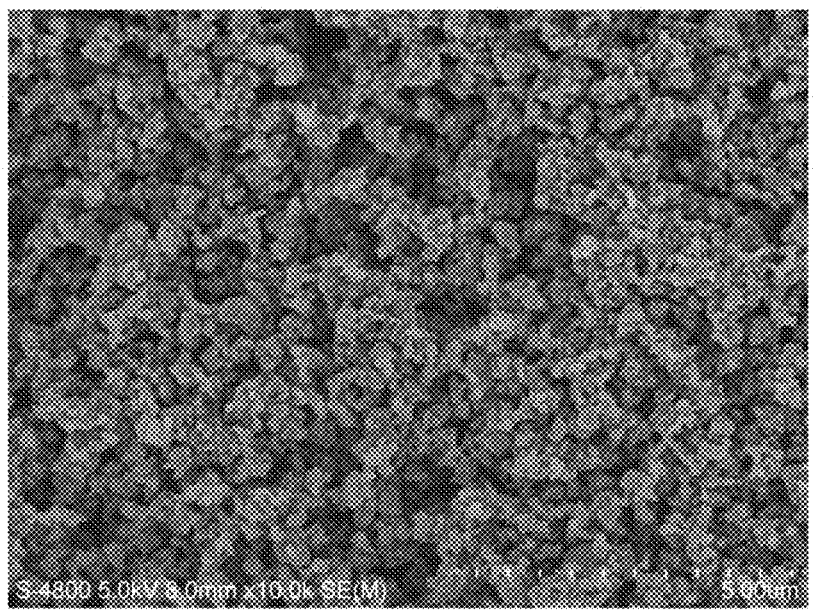
FIG. 3 is an electron micrograph showing the particle shape of Sample C obtained in Example 3.
Figure 4:
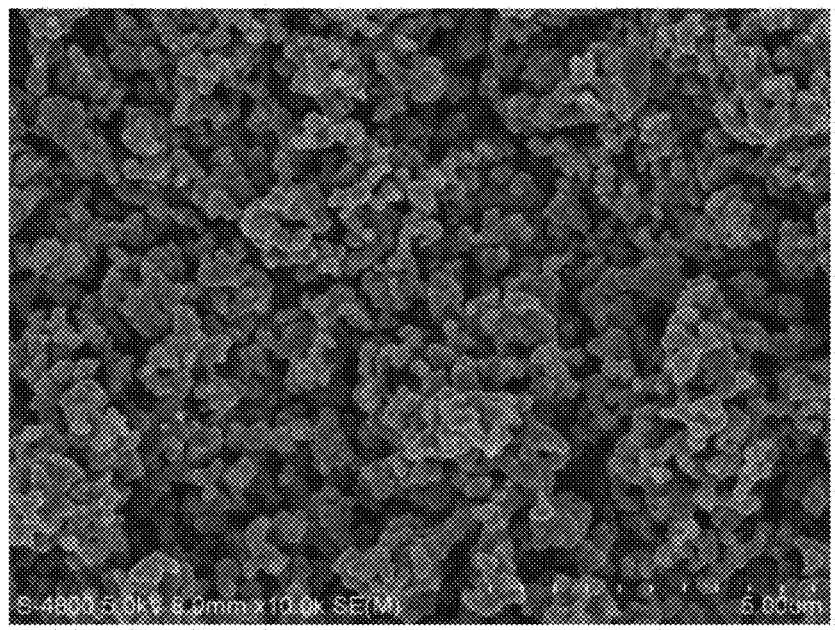
FIG. 4 is an electron micrograph showing the particle shape of Sample D obtained in Comparative Example 1.
Figure 5:
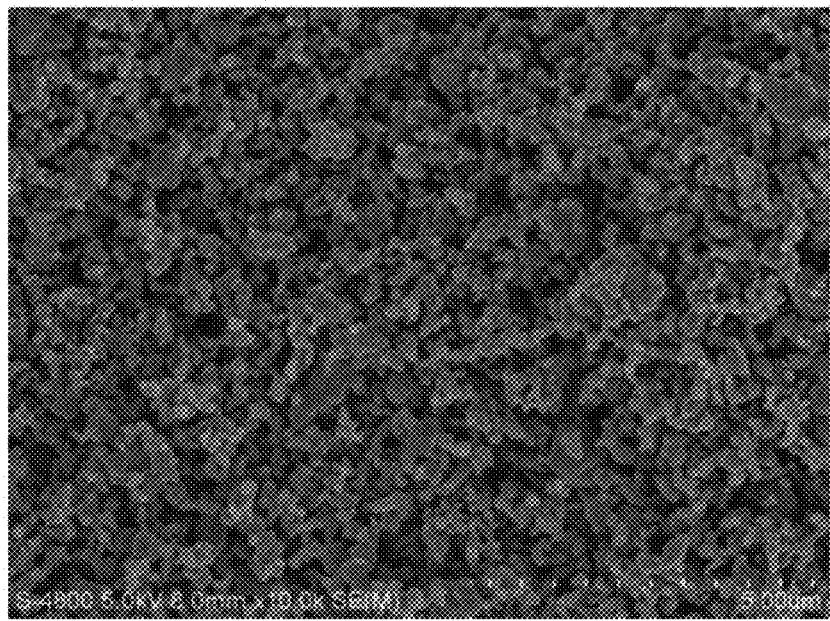
FIG. 5 is an electron micrograph showing the particle shape of Sample E obtained in Comparative Example 2.
Figure 6:
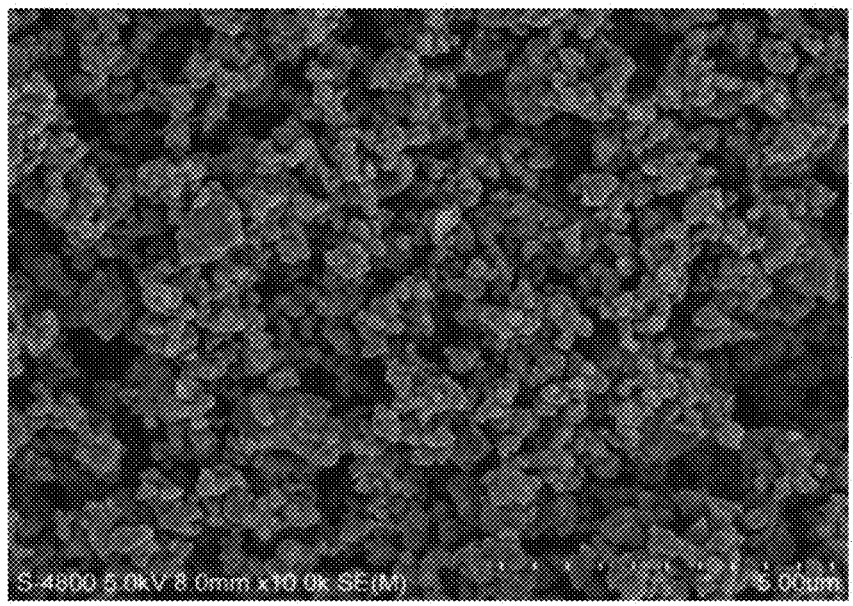
FIG. 6 is an electron micrograph showing the particle shape of Sample F obtained in Comparative Example 3.
Figure 7:
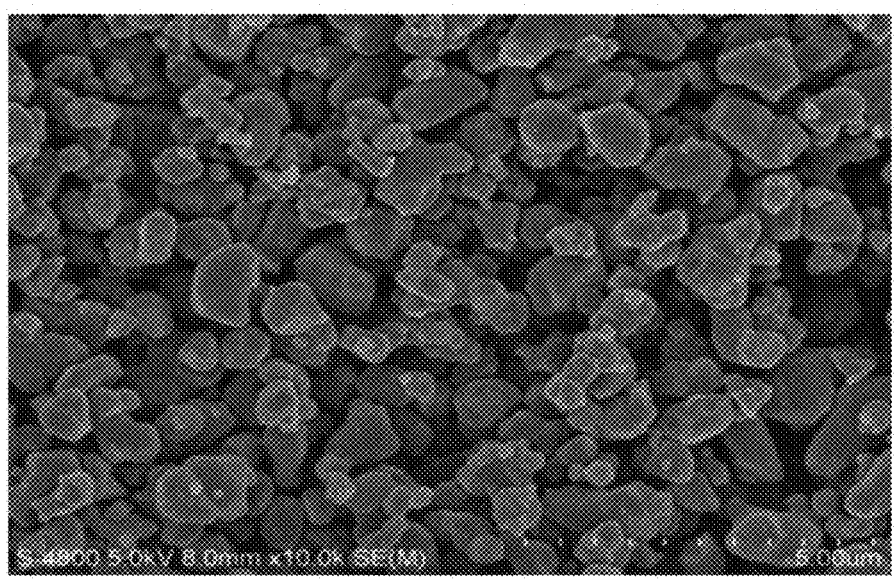
FIG. 7 is an electron micrograph showing the particle shape of Sample G obtained in Comparative Example 4.

The present invention is a perovskite type composite oxide including at least an alkaline earth metal element, a titanium element, and a manganese element. Specifically, the composite oxide can include an alkaline earth metal titanate compound (which is represented by the composition formula $AeTiO_{3-\gamma}$) and an alkaline earth metal manganate compound (which is represented by the composition formula $Ae'MnO_{3-\gamma}$), and can include an alkaline earth metal titanate manganate compound (which is represented by the composition formula $Ae''(Ti_\alpha Mn_\beta)O_{3-\gamma}$) and the like. However, unlike mere mixtures of these, the composite oxide cannot be separated. Thus, the composition formula can be described as $xAeTiO_{3-\gamma} \cdot yAe'MnO_{3-\gamma} \cdot zAe''(Ti_\alpha Mn_\beta)O_{3-\gamma}$. In the composition formula, each of Ae, Ae', and Ae'' is at least one alkaline earth metal element selected from a magnesium element, a calcium element, a strontium element, and a barium element, and may be the same or different from each other. Ti represents a titanium element, Mn represents a manganese element, and O represents an oxygen element. Herein, x, y, and z are real numbers, $0 \leq x < 1$, $0 \leq y < 1$, $0 \leq z \leq 1$, and $x+y+z=1$. Also, $\alpha$ and $\beta$ are real numbers, $0 < \alpha < 1$, $0 < \beta < 1$, and $\alpha + \beta = 1$. Also, $\gamma$ is a real number and $0 \leq \gamma < 3$. The alkaline earth metal titanate manganate compound represented by the composition formula $Ae''(Ti_\alpha Mn_\beta)O_{3-\gamma}$ may be an alkaline earth metal titanate compound solid-solved (doped) with manganese or an alkaline earth metal manganate compound solid-solved (doped) with titanium.

The alkaline earth metal element as described above is preferably at least one selected from a calcium element, a strontium element, and a barium element because of forming a composite oxide which has excellent near-infrared reflectivity and which has a perovskite type structure. A magnesium element which is classified as an alkaline earth metal element forms an ilmenite type structure when used singly, but forms a composite oxide of a perovskite type structure when used in combination with an alkaline earth metal element other than a magnesium element, such as a calcium element, a strontium element, a barium element, or a mixture thereof. Additionally, the perovskite type composite oxide has more excellent near-infrared reflectivity compared with those to which the magnesium element is not added. Thus, such a combination is preferable when using a magnesium element as the alkaline earth metal element. The content of the magnesium element can be approximately set depending on desired performance of the near-infrared reflectivity or the like, and the atomic ratio of the magnesium element (Mg) to the alkaline earth metal element (A) other than a magnesium element, which is the ratio of the number of the magnesium atoms to the number of the alkaline earth metal atoms other than magnesium atoms and is often referred to as a molar ratio is preferably $1.0 \times 10^{-6} \leq Mg/A \leq 0.20$, more preferably $1.0 \times 10^{-6} \leq Mg/A \leq 0.12$. Herein, "Mg" represents the number of moles of the element of magnesium, and "A" represents the number of moles of the element of alkaline earth metal other than magnesium.

The near-infrared reflective material of the present invention can further include a Group 13 element in the periodic table such as a boron element, an aluminum element, a gallium element, an indium element, or a mixture thereof. It is more preferable to include the Group 13 element in the periodic table because of providing more excellent near-infrared reflectivity than those to which the Group 13 element in the periodic table is not added. It is still more preferable to include at least one selected from an aluminum element and a gallium element among the Group 13 element in the periodic table because of particularly providing excellent near-infrared reflectivity. The Group 13 element in the periodic table can exist on the surface of and/or inside the particles of the perovskite type composite oxide, and preferably exists inside the particles of the perovskite type composite oxide. The content of the Group 13 element in the periodic table can be appropriately set depending on the performance of desired near-infrared reflectivity or the like, and it is preferable to include the amount that satisfies $0.0005 \leq Al/Ti \leq 1.5$ in the atomic ratio (molar ratio) of the Group 13 element (Al) in the periodic table to the titanium element (Ti). Herein, "Al" represents the number of moles of the Group 13 element in the periodic table, and "Ti" represents the number of moles of the titanium element. The value of the above atomic ratio (molar ratio) of Al/Ti is preferably in the range of 0.0005 to 1.5 because of providing excellent near-infrared reflectivity, more preferably $0.001 \leq Al/Ti \leq 0.45$, still more preferably $0.005 \leq Al/Ti \leq 0.35$, and most preferably $0.005 \leq Al/Ti \leq 0.25$. The value of Al/Ti of 0.0005 or more is preferable because the problem that effects caused by its addition are insufficient can be avoided. The value of Al/Ti of 1.5 or less is preferable because the problem that generation of another phase starts can be avoided.

Also, the near-infrared reflective material of the present invention can further include a zinc element in the perovskite type composite oxide including the above alkaline earth metal element, the titanium element, and the manganese element, or in the perovskite type composite oxide further including the Group 13 element in the periodic table, such as the boron element, the aluminum element, the gallium element, and the indium element. It is more preferable to include the zinc element because of providing more excellent near-infrared reflectivity than those to which the zinc element is not added. The zinc element can exist on the surface of and/or inside the particles of the perovskite type composite oxide, and preferably exists inside the particles of the perovskite type composite oxide. The content of the zinc element can be appropriately set depending on performance of desired near-infrared reflectivity or the like, and the amount that satisfies $1.0 \times 10^{-6} \leq Zn/Ti \leq 0.20$ in the atomic ratio (molar ratio) of the titanium element (Ti) to the zinc element (Zn) is preferably included therein. Herein, "Zn" represents the number of moles of the zinc element, and "Ti" represents the number of moles of the titanium element. The value of the above atomic ratio (molar ratio) of Zn/Ti is preferably in the range of $1.0 \times 10^{-6}$ to 0.2 because of providing excellent near-infrared reflectivity, more preferably $1.0 \times 10^{-6} \leq Zn/Ti \leq 0.15$, and still more preferably $1.0 \times 10^{-6} \leq Zn/Ti \leq 0.12$. The value of Zn/Ti smaller than $1.0 \times 10^{-6}$ is not preferable because effects caused by its addition are insufficient. The value of Zn/Ti larger than 0.20 is not preferable because generation of another phase starts and drastic change in the powder color occurs.

In the case where the near-infrared reflective material of the present invention has perovskite type structure of the $ABO_3$ type, the ratio of a/b wherein the content of the above alkaline earth metal element is represented by a mol and the total content of the titanium element, the manganese element, the Group 13 element in the periodic table, and the zinc element is represented by b mol is usually adjusted so as to be 1. However, the composition that satisfies $1 < a/b \leq 1.5$, namely more than 1 time and not more than 1.5 times the alkaline earth metal element content, is more preferable because of providing more excellent near-infrared reflectivity than the composition of a/b=1. The range of $1 < a/b < 1.1$ is still more preferable because another phase other than the perovskite type structure hardly occurs even when the material is fired at a relatively low temperature.

The amounts of the alkaline earth metal element, the titanium element, the manganese element, the Group 13 element in the periodic table, and the zinc element, which are included in the near-infrared reflective material are determined by fluorescent X-ray analysis, and the amount of oxygen necessary to maintain the charge balance is calculated on the basis of the valence number of these components. Also, the crystalline structure of the near-infrared reflective material can be confirmed by means of X-ray diffraction.

The composition of the components constituting the near-infrared reflective material of the present invention can be identified by powder X-ray diffraction (CuKα ray), and is determined on the basis of the positions of the peaks appearing in the range of the Bragg angle (2θ) of 30 to 40°. Every peak used in the determination is not a minor peak but a clear peak. When three peaks are observed in the range of the Bragg angle (2θ) of powder X-ray diffraction of 30 to 40°, this indicates that the material is constituted by three composite oxides. When two peaks are observed, this indicates that the material is constituted by two composite oxides. When one peak is observed, this indicates that the material is constituted by one composite oxide. Each peak position may shift. For example, when calcium titanate is doped (solid-solved) with manganese, the peak of the calcium titanate is observed to shift toward the higher angle region as the amount of to be dope increases. The material of the present invention is preferably constituted by two or more composite oxides, and thus preferably has at least two peaks in the range of Bragg angle (2θ) of 30 to 40°, particularly of 32 to 36° in powder X-ray diffraction. Specifically, the two composite oxides represented by the composition formulas of $xAeTiO_{3-\gamma}$ and $yAe'MnO_{3-\gamma}$, the composition formulas of $xAeTiO_{3-\gamma}$ and $zAe''(Ti_\alpha Mn_\beta)O_{3-\gamma}$, or the composition formulas of $yAe'MnO_{3-\gamma}$ and $zAe''(Ti_\alpha Mn_\beta)O_{3-\gamma}$ are preferable because fine particulates can be manufactured.

In the near-infrared reflective material of the present invention, the alkaline earth metal titanate manganate compound (which is also represented by the composition formula of $Ae''(Ti_\alpha Mn_\beta)O_{3-\gamma}$) is preferably included, and solute atoms (specifically, manganese atoms, the Group 13 atoms in the periodic table, or zinc atoms) are preferably solid-solved and included inside the particles of and/or in the surface part of the particles of the composite oxide by forming a substitutional solid solution in which solvent atoms (specifically, the alkaline earth metal atoms and titanium atoms) at the lattice points of the perovskite type composite oxide are substituted by the solute atoms or by forming an interstitial solid solution in which solute atoms enter into the lattice gaps of the perovskite type composite oxide. More particularly, a solid solution is preferably formed in which the solvent atoms of titanium are substituted with the above solute atoms of the manganese, the Group 13 element in the periodic table, or the zinc. The composite oxide preferably maintains the perovskite type structure. When the $ABO_3$ type structure contains the manganese element in the above range of 0.01≤α/β≤3.0, β falls within the range of approximately 0.01 to 0.75, if represented by the atomic ratio (molar ratio) of Ae":Ti:Mn:O=1: α:β:3. The facts that the manganese element, the Group 13 element in the periodic table, or the zinc element are included therein can be confirmed by the result of the X-ray diffraction showing that peaks of any phase other than the composite oxide do not appear.

Impurities derived from various raw materials may be inevitably mixed in the near-infrared reflective material according to the present invention. In this case, it is preferable that Cr is not included therein as much as possible. Even if Cr is included as impurities, the content is 1% by mass or less, and particularly, the content of $Cr^{6+}$ which causes concern about safety is preferably 10 ppm or less. Also, it is preferable that the unreacted residue of the raw material is not included as much as possible. Particularly, its content is preferably 1% by mass or less.

The near-infrared reflective material of the present invention has a BET specific surface area value (a single point method based on nitrogen absorption is adopted) in the range of 3.0 to 150 m²/g. In the case where a BET specific surface area value is less than 3.0 m²/g, the particles are coarse, or the particles are mutually sintered, and thus the hiding power is poor and the tinting strength is reduced. The BET specific surface area value is more preferably 3.0 to 50 m²/g, and still more preferably 3.0 to 25 m²/g. The BET specific surface area can be measured by means of Macsorb HM model 1220 (manufactured by Mountech Co., Ltd.). From this BET specific surface area value, the average particle size when the particle shape is assumed to be spherical is calculated by the following expression 1. The average particle size calculated from the BET specific surface area value is preferably 0.01 to 0.49 μm, more preferably 0.03 to 0.49 μm, and still more preferably 0.06 to 0.49 μm. This average particle size may be different from the average particle size calculated on the basis of an electron micrograph due to influences such as the particle shape and particle size distribution.

$$L=6/(\rho \cdot S) \quad \text{Expression 1:}$$

wherein L is an average particle size (μm), ρ is the density of a sample (g/cm³), and S is the BET specific surface area value of the sample (m²/g). Herein, a density of the sample is calculated by using each density (absolute specific gravity) of the alkaline earth metal titanate compound and the alkaline earth metal manganate compound and estimating the respective content. For example, the density of $CaTiO_3$ uses the value of 4.04 g/cm³, and the density of $CaMnO_3$ uses the value of 4.53 g/cm³.

The near-infrared reflective material of the present invention can have various particle shapes and particle sizes by changing production conditions. The particle shape may be tabular, granular, approximately spherical, needle-like, indefinite and the like. Preferably, an average particle size (arithmetic mean value of the largest diameter of one particle) measured from an electron micrograph is approximately 0.005 to 1.0 μm. The average particle size of 1.0 μm or less is preferable because the particle size is not so large that the problem of poor hiding power and reduced tinting strength can be avoided. The average particle size of 0.005 μm or more is preferable because the problem of possible difficulty in dispersion in a coating material can be avoided. For this reason, the average particle size is preferably 0.01 to 0.5 μm, more preferably 0.02 to 0.5 μm, and still more preferably 0.03 to 0.5 μm.

The powder color of the near-infrared reflective material of the present invention is black. The blackness expressed by a lightness index L value according to the Hunter Lab color space (Lab color system), (wherein the L value is referred to as a Hunter L value, and decreases as the blackness increases) is preferably 30 or less, more preferably 28 or less, and still more preferably 25 or less. Thus, the near-infrared reflective material of the present invention can reduce the lightness index L value, and thus can be used as a black pigment. With respect to the a value and the b value of the Lab color system measured in the same manner as the L value, the a value can suppress redness to be approximately −5 to 20, and the b value can suppress yellowness to be approximately −5 to 10, for example. The near infrared reflectivity changes depending on the powder color. Black powder, which easily absorbs infrared rays, has the near-infrared reflectivity relatively lower than that of white powder reflecting infrared rays. However, when the near-infrared reflectivity of the black powder is expressed by a reflectance at a wavelength of 1200 nm, the reflectance is 40% or more, preferably 45% or more, more preferably 50% or more, still more preferably 52% or more.

The near-infrared reflective material of the present invention is one composite oxide. Differences between the composite oxide and a mixture of each component composition constituting the composite oxide can be clearly confirmed by comparing the composite oxide with a sample prepared so as to have the same composition as the composite oxide by mixing the titanium compound of the above alkaline earth metal element and the manganese compound of the above alkaline earth metal element. Namely, compared with this comparative sample, the near infrared reflective material of the present invention has the lower L value of the powder and the higher reflectance at a wavelength of 1200 nm. Additionally, in the near-infrared reflective material of the present invention, both the tinting strength expressed by a relative tinting strength Kr which is evaluated according to the method as described below and the hiding power expressed by a contrast ratio (CR ratio) are higher than this comparative sample, and the L value showing an index of the blackness is lower.

(1) Comparative Evaluation of Relative Tinting Strength

The photometric method described in JIS K 5101-3-3 is used within the range of the mass proportion of a titanium dioxide pigment ($TiO_2$) to the other mixture of 3/1. The tinting strength of a mixed product of the titanium dioxide pigment ($TiO_2$) and the black fine particulate near-infrared reflective material of the present invention is preferably 105% or more when expressed by the relative tinting strength Kr (at a wavelength λ=555 nm) with regard to the tinting strength of a mixed product of the above titanium dioxide pigment ($TiO_2$) and a mixture of an alkaline earth metal titanate compound and an alkaline earth metal manganate compound wherein the mixture has almost the same BET specific surface area and component composition as the above black fine particulate near-infrared reflective material, and still more preferably 110% or more.

(2) Comparative Evaluation of L Value

The L value of a coating film is used within the range of the mass proportion of a titanium dioxide pigment to the other mixture of 3/1. When the L value of the mixed product of the titanium dioxide pigment ($TiO_2$) and the black fine particulate near-infrared reflective material of the present invention is compared with the L value of the mixed product of the above titanium dioxide pigment ($TiO_2$) and the mixture of the alkaline earth metal titanate compound and the alkaline earth metal manganate compound wherein the mixture has almost the same BET specific surface area and component composition as the above black fine particulate near-infrared reflective material, the L value of the mixed product of the present invention is preferably 95% or less with regard to this comparative sample, and still more preferably 90% or less.

(3) Method for Measuring Hiding Power

After the sample is sufficiently ground by means of an agate mortar, a coating material is prepared on the basis of an alkyd/melamine formulation (PVC (pigment volume concentration) of 19.2%, SVC (solid content volume concentration) of 45.3%). The prepared coating material is diluted five times with a clear resin (alkyd/melamine resin, NV40%) which does not include the above filler (the above sample), and is applied on test paper for hiding power with a bar coater. After drying it, each colorimetry on the Y value of the base white color (Yw) and the Y value of the base black color (Yb) in the XYZ display system is conducted by means of colorimetric color difference meter ZE2000 (manufactured by Nippon Denshoku Industries Co., Ltd.), and the Yb/Yw is calculated as a contrast ratio (CR). As this CR ratio increases, the hiding power becomes better.

The near-infrared reflective material of the present invention can be used for coating materials, inks, plastics, ceramics, electronic materials and the like. In order to enhance the dispersibility in a solvent or resin to be blended, the surface of the particles can be coated with an inorganic compound and/or an organic compound, as required. Examples of the inorganic compound preferably include at least one selected from a silicon compound, a zirconium compound, an aluminum compound, a titanium compound, an antimony compound, a phosphorus compound, and a tin compound. As the silicon compound, the zirconium compound, the aluminum compound, the titanium compound, the antimony compound, and the tin compound, the oxides, hydrated oxides, or hydroxides of silicon, zirconium, aluminum, titanium, antimony, and tin are more preferable. As the phosphorus compound, phosphoric acid compounds or phosphate compounds are more preferable. Examples of the organic compound include organic silicon compounds, organometallic compounds, polyols, alkanolamines or derivatives thereof, higher fatty acids or metal salts thereof, and higher hydrocarbons or derivatives thereof, and at least one selected from these can be used.

The near-infrared reflective material of the present invention includes the alkaline earth metal element, the titanium element, and the manganese element, and further includes, as required, the Group 13 element in the periodic table such as the boron element, the aluminum element, the gallium element, and the indium element, and the zinc element. The alkaline earth metal element, the manganese element, and the like can be eluted in water, and are easily eluted particularly in acidic water. For this reason, in the case where the water elution property needs to be suppressed, it is effective to coat the surface of the particles of the near-infrared reflective material with an inorganic compound. Examples of such an inorganic compound include at least one compound selected from a silicon compound, a zirconium compound, an aluminum compound, a titanium compound, an antimony compound, a phosphorus compound, and a tin compound. The oxides, hydrated oxides, or hydroxides of silicon, zirconium, aluminum, titanium, antimony, and tin are more preferable as the silicon compound, the zirconium compound, the aluminum compound, the titanium compound, the antimony compound, and the tin compound. Phosphoric acid compounds or phosphate compounds are more preferable as the phosphorus compound.

Particularly, the silicon or aluminum oxides, the silicon or aluminum hydrated oxides, or the silicon or aluminum hydroxides are preferable. As for the silicon oxides, the silicon hydrated oxides, and the silicon hydroxides (which are often referred to as silica hereinafter), ones capable of forming high-density silica or porous silica are more preferable. Although silica used in the coating treatment becomes porous or non-porous (high-density) depending on the pH range at the time of the silica coating treatment, the high-density silica is more preferable because of providing an effect of highly suppressing the water elution property of the near-infrared reflective material by easily forming a fine coating. For this reason, it is preferable that a first coating layer of the high-density silica exists on the surface of the particles of the near-infrared reflective material, and a second coating layer of the porous silica or of the aluminum oxide, the aluminum hydrated oxide, or the aluminum hydroxide (which are often referred to as alumina hereinafter) exists thereon. The silica coating can be observed by means of an electron microscope. The coating amount of the inorganic compound can be set as appropriate. For example, the amount is preferably 0.1 to 50% by mass, more preferably 1.0 to 20% by mass, with regard to the near-infrared reflective material. The amount of the inorganic compound can be measured by means of the conventional method such as fluorescent X-ray analysis and ICP optical emission spectrometry.

The method for manufacturing a black fine particulate near-infrared reflective material of the present invention includes: mixing at least the alkaline earth metal compound, the titanium compound, the manganese compound while strongly grinding them, preferably by means of a wet grinder; and firing the mixture at a temperature of 800 to 1100° C. Also, in the case where the compound of the Group 13 element in the periodic table and the zinc compound are included therein as required, the compounds are similarly mixed while being strongly grinded, preferably by means of a wet grinder. Oxides, hydroxides, carbonates or the like of magnesium, calcium, strontium, barium and the like can be used as the alkaline earth metal compound. Oxides, hydroxides, carbonates or the like of titanium, manganese, and zinc can be used as the titanium compound, the manganese compound, and the zinc compound. Oxides, hydroxides, carbonates or the like of boron, aluminum, gallium, indium, and the like can be used as the compound of the Group 13 element in the periodic table. These raw materials are weighed and mixed while be strongly grinded, preferably by means of a wet grinder. Examples of the grinder capable of mixing the raw materials while strongly grinding them include dry grinders and wet grinders.

As the dry grinder, the well-known apparatuses can be used as appropriate. For example, dry jet mills, hammer mills, dry bead mills, impeller mills, and ball mills can be used.

Also, as the wet grinder, the well-known apparatuses can be used as appropriate. The wet grinders including media, such as bead mills, sand grinder mills, and media stirring mills, or wet grinders including no media, such as stirring mills, disk mills, inline mills, and jet mills can be used. In the present invention, the use of the wet grinder is preferable because the wet grinder can perform strong grinding than the dry grinders, thereby sufficiently reducing the particle size of the raw material to achieve the sufficient mixing. The wet grinders including media, for example, ball mills, wet bead mills and the like are particularity preferable because of sufficiently mixing the raw material. The strong grinding as described above allows the accumulated 90% particle size of the raw material powder to be 1.5 μm or less. Particularly, 1.3 μm or less is preferable (The accumulated 90% particle size is determined by the laser diffraction/scattering method. Water is used as the dispersion medium, and the refractive index is set to 2.00.). In the present invention, a dispersant can be added when the wet grinding is performed. For example, polymer dispersants such as polyoxyalkylene dispersants and polycaroboxylic acid dispersants are preferably used. The amount of the dispersant to be added can be set as appropriate. After mixing each raw material, the mixture can be filtered, dried, or spray-dried as required.

Next, the mixture of the above raw material compounds is granulated and/or molded as required, and subsequently fired. The firing temperature is preferably in the range of 800 to 1100° C., more preferably 850 to 1050° C., and still more preferably 900 to 1050° C. The firing temperature higher than 1100° C. leads to increase in the particle size of the product, thereby reducing the hiding power and the tinting strength. Also, the firing temperature less than 800° C. leads to the remains of the unreacted residue, thereby easily resulting in a reddish hue. By using a mixture prepared by mixing the raw materials while strongly grinding them, the product having a small particle size, which includes a perovskite type composite oxide, particularly two or more perovskite type composite oxides can be easily obtained even in the above temperature range in which the unreacted residue is usually likely to remain. Thus, the near-infrared reflective material having the good balance of tinting strength and blackness can be provided. If the firing temperature is higher than 1100° C., one perovskite type composite oxide is likely to be obtained. While the atmosphere at the time of firing may be any atmosphere, the firing in the air is preferable in terms of keeping the sufficient near-infrared reflectivity. The firing time can be set as appropriate, and is preferably for 0.5 to 24 hours, more preferably for 1.0 to 12 hours. The firing time of 0.5 hours or more is preferable because the problem that the insufficient progress of the reaction frequently occurs can be avoided. Also, the firing time of 24 hours or less is preferable because the problems that an increase in the hardness of the particles and the production of unusually coarse particles may occur due to the sintering can be avoided. As for the firing apparatus, electric furnaces, rotary kilns and the like can be used as appropriate. In the case where the compound of the Group 13 element in the periodic table or the zinc compound is mixed and the amounts of these compounds are small, it is preferable that these compounds preliminarily exist on the surface of and/or inside the particles of the titanium compound. This is because the solid-phase synthesis reaction is uniformly performed thereby, and thus the uniform near-infrared reflective material can be obtained. For this reason, the case where the compound of the Group 13 element in the periodic table or the zinc compound is preliminarily deposited and exists on the surface of the particles of the compound such as an oxide, a hydrated oxide, a hydroxide or the like of titanium and the case where the compound of the Group 13 element in the periodic table or the zinc compound preliminarily exists inside the particles are preferable because the Group 13 element in the periodic table or the zinc element comes to easily exist inside the particles of the perovskite type composite oxide. The method is not particularly limited, and the well-known methods can be used.

Moreover, in order to more uniformly perform the firing reaction or in order to more uniformly make the particle size of the near-infrared reflective material, a firing treatment agent (particle size regulating agent) can be added to the mixture of the raw material compounds, and then can be fired. As such a firing treatment agent, alkali metal compounds, silicon compounds such as silica and silicate, tin compounds such as tin oxide and tin hydroxide, and the compounds of the Group 13 element in the periodic table such as boron element, aluminum element, gallium element, and indium element can be also used. However, the firing treatment agent is not limited to these, and various inorganic compounds or organic compounds can be used. Although the additive amount of the firing treatment agent (particle size regulating agent) can be set as appropriate, the amount so as not to reduce the near-infrared reflectivity is preferable. Particularly, the addition of the alkali metal compound to the mixture of the raw material compound, followed by the firing is preferable because a near-infrared reflective material having the more uniform particle size is easily obtained. Furthermore, the addition of the alkali metal compound also has the advantages, e.g. the grinding after the firing is relatively easy. Even if the alkali metal compound remains in the obtained near-infrared reflective material, any adverse influence on the near-infrared reflectivity is not observed, and the remaining alkali metal compound can be dissolved and removed by water washing. Potassium compounds such as potassium chloride, potassium sulfate, potassium nitrate, and potassium carbonate, sodium compounds such as sodium chloride, sodium sulfate, sodium nitrate, and sodium carbonate, and lithium compounds such as lithium chloride, lithium sulfate, lithium nitrate, and lithium carbonate can be used as the alkali metal compound. The additive amount of the alkali metal compound in terms of conversion of an alkali metal into an oxide ($K_2O$, $Na_2O$, $Li_2O$, or the like) is preferably 0.01 to 15 parts by weight, more preferably 0.1 to 6 parts by weight, based on 100 parts by weight of the mixture of the raw material compounds.

The refiring of the composite oxide obtained by the method described above is preferable because the crystallinity of the composite oxide further increases, thereby suppressing the water elution properties of the alkaline earth metal elements, the manganese element and the like. The refiring temperature is preferably in the range of 200 to 1100° C., more preferably 400 to 1100° C. Although the atmosphere at the time of the refiring may be any atmosphere, the firing in the air is preferable in order to keep the sufficient near-infrared reflectivity. The refiring time can be set as appropriate, and is preferably for 0.5 to 24 hours, more preferably for 1.0 to 12 hours.

In order to coat the surface of the particles of the near-infrared reflective material obtained according to the above methods with the inorganic compound or the organic compound, the conventional surface treatment methods used for the titanium dioxide pigment or the like can be used. Specifically, it is preferable to coat the above surface by adding an inorganic compound or an organic compound to a slurry of the near-infrared reflective material, and it is more preferable to deposit the inorganic compound or the organic compound by neutralizing it in the slurry, thereby coating the above surface. Also, the inorganic compound or the organic compound can be mixed by being added to the powder of the near-infrared reflective material, mixed them, thereby coating the surface thereof.

Specifically, in order to coat the surface of the particles of the near-infrared reflective material with the high-density silica, the pH of an aqueous slurry of the near-infrared reflective material is firstly adjusted to 8 or more, preferably to 8 to 10 by the use of an alkali compound (for example, sodium hydroxide or potassium hydroxide), ammonia or the like. Then, the aqueous slurry is heated to 70° C. or more and preferably to 70 to 105° C. Then, a silicate is added to the aqueous slurry of the near-infrared reflective material. As the silicate, various silicates such as sodium silicate and potassium silicate can be used. Usually, the silicate is preferably added over 15 minutes or more, more preferably over 30 minutes or more. Next, after the addition of the silicate is completed, the further stirring and mixing are sufficiently performed as required. Subsequently, the slurry is neutralized with an acid while keeping the slurry temperature at 80° C. or more, more preferably at 90° C. or more. Examples of the acid which is used herein include sulfuric acid, hydrochloric acid, nitric acid, phosphoric acid, and acetic acid. These can adjust the pH of the slurry preferably to 7.5 or less, more preferably to 7 or less, thereby coating the surface of the particles of the near-infrared reflective material with the high-density silica.

Also, in order to coat the surface of the particles of the near-infrared reflective material with the porous silica, the acid such as sulfuric acid, hydrochloric acid, nitric acid, phosphoric acid, and acetic acid is firstly added to an aqueous slurry of the near-infrared reflective material so as to adjust the pH to 1 to 4, preferably to 1.5 to 3. The slurry temperature is preferably adjusted to the range of 50 to 70° C. Then, while the slurry pH is kept in the above range, a silicate and an acid are added thereto so as to form the porous silica coating. As the silicate, various silicates such as sodium silicate and potassium silicate can be used. The silicate is usually preferably added over 15 minutes or more, more preferably over 30 minutes or more. After the addition of the silicate is completed, an alkali compound is, as required, added to adjust the pH of the slurry to approximately 6 to 9, thereby coating the surface of the particles of the near-infrared reflective material with the porous silica.

On the other hand, in order to coat the surface of the particles of the near-infrared reflective material with alumina, it is preferable that after a slurry of the near-infrared reflective material is firstly neutralized to pH 8 to 9 with an alkali such as sodium hydroxide in a reactor, the slurry is heated at temperature of 50° C. or more, and then concurrent addition of an aluminum compound and an acidic aqueous solution thereto are conducted. As the aluminum compound, aluminates such as sodium aluminate and potassium aluminate can be suitably used. As the acidic aqueous solution, aqueous solutions of sulfuric acid, hydrochloric acid, nitric acid and the like can be suitably used. The above concurrent addition means a method for continuously or intermittently adding a small amount of the aluminum compound and a small amount of the acidic aqueous solution separately to the reactor. Specifically, it is preferable that the aluminum compound and the acidic aqueous solution are simultaneously added over approximately 10 minutes to 2 hours while keeping the pH in the reactor at 8.0 to 9.0. It is preferable that after the aluminum compound and the acidic aqueous solution are added to the reactor, the acidic aqueous solution is further added so as to adjust the pH to approximately 5 to 6.

The refiring of the composite oxide coated with the above inorganic compound or the above organic compound is preferable because the crystallinity of the composite oxide further increases, thereby suppressing water elution properties of the alkaline earth metal elements, the manganese element, and the like. The refiring temperature is preferably in the range of 200 to 1100° C., more preferably 400 to 1100° C. While the atmosphere at the time of the refiring may be any atmosphere, the firing in the air is preferable in order to keep the sufficient near-infrared reflectivity. The refiring time can be set as appropriate, and is preferably for 0.5 to 24 hours, more preferably for 1.0 to 12 hours.

The composite oxide obtained by the above method can be used in various forms such as powder and a molded body. In the case where the composite oxide is used as a powder, it can be grinded to adjust the particle size thereof as required. In the case where the composite oxide is used as a molded body, the powder can be molded into an appropriate size and shape. As a grinder, impact grinders such as hammer mills and pin mills, milling grinders such as roller mills and pulverizers, and stream grinders such as jet mills can be used, for example. As a molding machine, general-purpose molding machines such as extrusion machines and granulators can be used, for example.

The near-infrared reflective material of the present invention has the sufficient near-infrared reflectivity. By mixing it with the other compound having the near-infrared reflectivity, the further enhancement of the near-infrared reflectivity or the complementation of the reflectivity at a specific wavelength can be achieved. As the other compound having the near-infrared reflectivity, those conventionally used can be used. Specifically, inorganic compounds such as titanium dioxide, iron-chromium based compounds, manganese-bismuth based compounds, and yttrium-manganese based compounds are preferable. The type and mixing proportion of the other compound having the near-infrared reflectivity can be selected as appropriate according to the intended uses thereof.

The near-infrared reflective material of the present invention has a black tone. By mixing it with the other pigment, the further enhancement of the blackness, the provision of the gray toning, or the provision of the color such as red, yellow, green, and blue can be achieved. As the other pigment described above, inorganic pigments, organic pigments, lake pigments, and the like can be used. Specifically, examples of the inorganic pigment include white pigments such as titanium dioxide, zinc white, and precipitated barium sulfate, red pigments such as iron oxide, blue pigments such as ultramarine blue and Prussian blue (potassium ferric ferrocyanide), black pigments such as carbon black, and pigments such as aluminum powder. Examples of the organic pigment include organic compounds such as anthraquinone, perylene, phthalocyanine, azo compounds, and azo methiazo compounds. The type and mixing proportion of the pigment can be selected as appropriate according to the color and hue.

Then, the present invention is a solvent dispersant including the black fine particulate near-infrared reflective material. As the solvent, inorganic solvents such as water, organic solvents such as alcohols, alkyls, glycols, ethers, ketones, benzenes, and acetates, and mixed solvents of an inorganic solvent and an organic solvent can be used. The concentration of the near-infrared reflective material can be adjusted as appropriate, and is preferably approximately 1 to 1000 g/l. A dispersing agent, a pigment, a filler, an aggregate, a thickener, a flow controlling agent, a leveling agent, a curing agent, a crosslinking agent, a catalyst for curing, and the like can be blended to the solvent dispersant. The solvent dispersant can be manufactured using a conventional method, and the near infrared reflective material is preferably dispersed in a solvent by means of a wet grinder. As the wet grinder, the well-known apparatuses can be used as appropriate, and the wet grinders including media such as bead mills, sand grinder mills, and media stirring mills, or the wet grinders including no media such as stirring mills, disk mills, inline mills, and jet mills can be used. In the present invention, the wet grinders including media are preferably used in order to sufficiently disperse the near-infrared reflective material.

Then, the present invention is a coating material including the above near-infrared reflective material. The coating material of the present invention includes a composition called as an ink. Also, the present invention is a resin composition containing the above near-infrared reflective material. Also, the present invention is a fiber composition including the above near-infrared reflective material. Also, the present invention is a near-infrared reflector wherein the coating material prepared by blending the above infrared reflective material is applied onto a base material.

When the near-infrared reflective material of the present invention is included in a resin such as a coating material, an ink, or a plastic molded product such a film, a composition having excellent near-infrared reflectivity can be obtained. In such coating materials, inks, and resin compositions, the amount of the near-infrared reflective material with regard to the resin can be included as appropriate. The amount of the near-infrared reflective material is preferably 0.1% by mass or more, more preferably 1% by mass or more, and still more preferably 10% by mass or more. In addition, a composition-forming material used in each field can be blended, and various kinds of additives can be further blended.

Specifically, in the case of obtaining a coating material or an ink, in addition to a coating film-forming material or an ink film-forming material, a solvent, a dispersing agent, a pigment, a filler, an aggregate, a thickener, a flow controlling agent, a leveling agent, a curing agent, a crosslinking agent, a catalyst for curing, and the like can be blended. As the coating film-forming material, organic components such as acrylic resins, alkyd resins, urethane resins, polyester resins, and amino resins, and inorganic components such as organosilicate, organotitanate, cement, and gypsum can be used, for example. As the ink film-forming material, urethane resins, acrylic resins, polyamide resins, vinyl chloride-vinyl acetate-based copolymer resins, chlorinated propylene resins, and the like can be used. Various kinds of resins such as heat-curable resins, room temperature-curable resins, and ultraviolet-curable resins can be used for these coating film-forming materials and ink film-forming materials without limitation. In the case of using the ultraviolet-curable resin of a monomer or an oligomer as the coating film-forming materials and ink film-forming materials; blending a photopolymerization initiator and a photosensitizer thereto; applying the obtained mixture, and then irradiating ultraviolet light to be cured, a coating film having excellent hardness and adhesion can be obtained without giving thermal load to the base material. Thus, these coating film-forming materials and ink film-forming materials are preferable.

The coating material of the present invention can be applied onto a base material to manufacture a near-infrared reflector. This near-infrared reflector can be used as an infrared shielding material and additionally as a thermal insulation material. Namely, the coating material of the present invention can be used as an infrared reflector. As the base material, those of various materials and various qualities can be used. Specifically, various building materials, civil engineering materials and the like can be used. The manufactured near-infrared reflector can be used as a roof material, a walling material, and a flooring material for houses and factories, and a paving material constituting roads and pavements. The thickness of the near-infrared reflector can be optionally set depending on various applications. For example, in the case where the near-infrared reflector is used as a roof material, the thickness thereof is approximately 0.1 to 0.6 mm and preferably 0.1 to 0.3 mm. In the case where the near-infrared reflector is used as a paving material, the thickness thereof is approximately 0.5 to 5 mm and preferably 1 to 5 mm. In order to apply the coating material onto the base material, an application method, a spraying method and a method of using a trowel are possible. After the application, the coating material can be dried, burned, or cured as required.

In the case where the near-infrared reflective material is used as a resin composition, in addition to a resin, a pigment, a dye, a dispersing agent, a lubricant, an antioxidant material, an ultraviolet absorbing agent, a light stabilizer, an antistatic agent, a flame retardant, a bactericide, and the like are kneaded with the near-infrared reflective material of the present invention, and are molded into an optional form such as a film form, a sheet form, a plate form and the like. As the resin, thermoplastic resins such as polyolefin based resins, polystyrene based resins, polyester based resins, acrylic based resins, polycarbonate based resins, fluoro based resins, polyamide based resins, cellulosic based resins, and polylactic based resins, and thermosetting resins such as phenol based resins and urethane based resins can be used. Such a resin composition can be molded into an optional form such as a film, a sheet, and a plate, and can be used as near-infrared reflectors for industrial uses, agricultural uses, home uses, and the like. The composition can be also used as a thermal insulation material that shields infrared rays.

A fiber composition including the near-infrared reflective material of the present invention can impart the near-infrared reflectivity to clothes, woven fabrics, non-woven fabrics, wall papers and the like. As the fiber, those known can be used. Examples of the fiber include cellulose regenerated fiber such as rayon, polyamide fiber such as nylon, polyester such as polyethylene terephthalate, acrylic fiber, and carbon fiber. When spinning the near-infrared reflective material into fiber, this near-infrared reflective material can be kneaded or fixed onto the surface of spun yarn to be used. As these methods, conventional methods can be used as appropriate. The fiber can include an optional amount of the near-infrared reflective material based on the fiber, and the amount of the fiber is preferably 0.1% by mass or more, more preferably 1% by mass or more.

EXAMPLES

Hereinafter, the present invention will be described using Examples and Comparative Examples, but the present invention will not be limited to those Examples.

Example 1

In a mayonnaise jar of 140 ml, calcium carbonate $CaCO_3$ (manufactured by Kojundo Chemical Laboratory Co., Ltd., purity of 99.99%) of 3.62 g, high purity titanium dioxide (PT-301 manufactured by Ishihara Sangyo Kaisha, Ltd., purity of 99.99%) of 2.02 g, manganese dioxide $MnO_2$ (manufactured by Kojundo Chemical Lab. Co., Ltd., purity of 99.99%) of 0.94 g, and α-alumina α-$Al_2O_3$ (manufactured by Kojundo Chemical Lab. Co., Ltd., purity of 99.99%) of 0.01 g were weighed and placed as a raw material, and zirconia beads and pure water were further added thereto. After sufficiently mixing and stirring the mixture by means of a paint shaker (manufactured by RED DEVIL EQUIPMENT COMPANY), a predetermined amount of the raw material powder obtained thereby was placed in an alumina crucible and fired at 1050° C. for four hours to obtain a composite oxide of a perovskite type structure containing titanium, manganese, calcium, and aluminum (Sample A). The accumulated 90% particle size of the raw material power after grinding and mixing the raw material was 1.26 μm. A laser diffraction/scattering particle size distribution analyzer (LA-910 manufactured by HORIBA, Ltd.) was used for measurement.

In Sample A, the value of the atomic ratio (molar ratio) of manganese to titanium, represented by Mn/Ti is 0.43, and the value of the atomic ratio (molar ratio) of aluminum to titanium, represented by Al/Ti is 0.007. The results of X-ray diffraction (FIG. 1) showed that the Bragg angle (2θ) had two peaks in the range of 30 to 40°. It is confirmed that these peaks are attributed to $CaTiO_3$ and $Ca(Ti_\alpha Mn_\beta)O_3$.

Example 2

Calcium carbonate $CaCO_3$ (manufactured by Kojundo Chemical Laboratory Co., Ltd., purity of 99.99%) of 100 g, high purity titanium dioxide (PT-301 manufactured by Ishihara Sangyo Kaisha, Ltd., purity of 99.99%) of 39.9 g, manganese dioxide $MnO_2$ (manufactured by Kojundo Chemical Lab. Co., Ltd., purity of 99.99%) of 42.2 g, α-alumina α-$Al_2O_3$ (manufactured by Kojundo Chemical Lab. Co., Ltd., purity of 99.99%) of 1.53 g, and a polyoxyalkylene dispersant were weighed and placed as a raw material, and sufficiently mixed and stirred by means of a DYNO-MILL grinder (Multi-Lab, manufactured by SHIN-MARU ENTERPRISES CORPORATION) which is a wet media stirring mill (bead mill). Then, a predetermined amount of the raw material powder obtained thereby was placed in an alumina crucible and fired at 1000° C. for four hours to obtain a composite oxide of a perovskite type structure containing titanium, manganese, calcium, and aluminum (Sample B). The accumulated 90% particle size of the raw material power after grinding and mixing the raw material was 0.87 μm.

In Sample B, the value of the atomic ratio (molar ratio) of manganese to titanium, represented by Mn/Ti is 0.43, and the value of the atomic ratio (molar ratio) of aluminum to titanium, represented by Al/Ti is 0.007. The results of X-ray diffraction showed that the Bragg angle (2θ) had two peaks in the range of 30 to 40°. It is confirmed that these peaks are attributed to $CaTiO_3$ and $Ca(Ti_\alpha Mn_\beta)O_3$.

Example 3

The same procedures as Example 2 were conducted except that the firing temperature was 900° C., thereby obtaining a composite oxide of a perovskite type structure containing titanium, manganese, calcium, and aluminum (Sample C). In the sample C, the value of the atomic ratio (molar ratio) of manganese to titanium, represented by Mn/Ti is 0.43, and the value of the atomic ratio (molar ratio) of aluminum to titanium, represented by Al/Ti is 0.007. The results of X-ray diffraction (FIG. 1) showed that the Bragg angle (2θ) had two peaks in the range of 30 to 40°. It is confirmed that these peaks are attributed to $CaTiO_3$ and $Ca(Ti_\alpha Mn_\beta)O_3$.

Comparative Example 1

Calcium carbonate $CaCO_3$ (manufactured by Kojundo Chemical Laboratory Co., Ltd., purity of 99.99%) of 3.68 g and high purity titanium dioxide (PT-301 manufactured by Ishihara Sangyo Kaisha, Ltd., purity of 99.99%) of 2.94 g were sufficiently mixed and stirred by means of an agate mortar. Then, a predetermined amount of the mixed powder was placed in an alumina crucible and fired at 1000° C. for four hours to obtain calcium titanate of a perovskite type structure ($CaTiO_3$) (Sample D). The results of X-ray diffraction (FIG. 1) showed that the Bragg angle (2θ) had one peak of $CaTiO_3$ in the range of 30 to 40°.

Comparative Example 2

Calcium carbonate $CaCO_3$ (manufactured by Kojundo Chemical Laboratory Co., Ltd., purity of 99.99%) of 3.68 g and manganese dioxide $MnO_2$ (manufactured by Kojundo Chemical Lab. Co., Ltd., purity of 99.99%) of 3.19 g were sufficiently mixed and stirred by means of an agate mortar. Then, a predetermined amount of the mixed powder was placed in an alumina crucible and fired at 1000° C. for four hours to obtain calcium manganate of a perovskite type structure ($CaMnO_3$) (Sample E). The results of X-ray diffraction (FIG. 1) showed that the Bragg angle (2θ) had one peak of $CaMnO_3$ in the range of 30 to 40°.

Comparative Example 3

Sample D of 1 mol and Sample E of 1 mol, which were respectively obtained in Comparative Example 1 and 2, were sufficiently mixed to obtain Sample F. The results of X-ray diffraction (FIG. 1) showed that the Bragg angle (2θ) had two peaks of $CaTiO_3$ and $CaMnO_3$ in the range of 30 to 40°.

Comparative Example 4

After calcium carbonate $CaCO_3$ (manufactured by Kojundo Chemical Laboratory Co., Ltd., purity of 99.99%) of 3.62 g, high purity titanium dioxide (PT-301 manufactured by Ishihara Sangyo Kaisha, Ltd., purity of 99.99%) of 2.02 g, manganese dioxide $MnO_2$ (manufactured by Kojundo Chemical Lab. Co., Ltd., purity of 99.99%) of 0.94 g, and α-alumina α-$Al_2O_3$ (manufactured by Kojundo Chemical Laboratory Co., Ltd., purity of 99.99%) of 0.01 g were weighed and placed as a raw material, and sufficiently mixed and stirred by means of an agate mortar. A predetermined amount of the raw material powder obtained thereby was placed in an alumina crucible and fired at 1200° C. for 4 hours to obtain calcium titanate of a perovskite type structure containing manganese and aluminum ($CaTiO_3$: Mn, Al) (Sample G). The accumulated 90% particle size of the raw material power after grinding and mixing the raw material was 1.65 μm.

In Sample G, the value of the atomic ratio (molar ratio) of manganese to titanium, represented by Mn/Ti is 0.43, and the value of the atomic ratio (molar ratio) of aluminum to titanium, represented by Al/Ti is 0.007. The results of X-ray diffraction (FIG. 1) showed that the Bragg angle (2θ) had one peak identified as $Ca(Ti_\alpha Mn_\beta)O_3$ in the range of 30 to 40°.

The BET specific surface areas of Samples A, C, D, E, F, and G obtained in the Examples and the Comparative Examples and the average particle sizes calculated from values of the specific surface areas are shown in Table 1. Sample A of the present invention has a specific surface area of 4.3 m²/g, and an average particle size of 0.34 μm calculated from the value. It was found that Sample A was a fine particulate. Sample C of the present invention has a specific surface area of 8.7 m²/g, and an average particle size of 0.17 μm calculated from the value. It was found that Sample C was a fine particulate. Sample G of Comparative Example 4 has a specific surface area of 2.6 m²/g and an average particle size of 0.56 μm calculated from the value, which was a large particle. Also, it was confirmed that the samples of Comparative Example 1 and Comparative Example 2 (namely, Samples D and E) had substantially the same specific surface area as Sample A. The BET specific surface area was measured by means of Macsorb HM model 1220 (manufactured by Mountech Co., Ltd.). The electron micrographs of Samples A, C, D, E, F, and G obtained in the Examples and the Comparative Examples are shown in FIGS. 2 to 7.

TABLE 1

| Sample | | Specific surface area (m$^2$/g) | Average particle size (μm) |
|---|---|---|---|
| Example 1 | A | 4.3 | 0.34 |
| Example 3 | C | 8.7 | 0.17 |
| Comparative Example 1 | D | 4.4 | 0.33 |
| Comparative Example 2 | E | 4.5 | 0.30 |
| Comparative Example 3 | F | — | — |
| Comparative Example 4 | G | 2.6 | 0.56 |

The measurement results of the colors of Samples A, C to G obtained in the Examples and the Comparative Examples are shown in Table 2. Samples A and C of the present invention have an L value of 30 or less wherein the L value is an index of blackness, and further show a hue in which the a value is approximately −5 to 20 and the b value is approximately −5 to 10. Thus, it was found that the present invention is used as a black material. It was found that the L value of Sample A of the present invention is comparable to that of Sample G of Comparative Example 4, and also comparable to that of Sample E of Comparative Example 2 including calcium manganese having a substantially equivalent particle size. It was also found that Sample C of the present invention has an L value further lower than Samples E and G, and thus exhibits excellent blackness. Sample D of Comparative Example 1 was calcium titanate, and showed white color. Thus, the mixture of calcium manganate and calcium titanate of Sample F of Comparative Example 3 had an L value larger than Sample A of Example 1, Sample C of Example 3, and Sample E of Comparative Example 2.

With respect to color, Samples A, C to G obtained in the Examples and the Comparative Examples were sufficiently ground by means of an agate mortar. Then, each sample was placed into an aluminum ring having a diameter of 30 mm, and press molded under a load of 9.8 MPa. The color of the powder was measured by means of colorimetric color difference meter ZE2000 (manufactured by Nippon Denshoku Industries Co., Ltd.)

TABLE 2

| | Sample | Powder Color | | |
|---|---|---|---|---|
| | | L | a | b |
| Example 1 | A | 21.2 | 0.58 | 0.19 |
| Example 3 | C | 19.4 | 0.82 | 1.27 |
| Comparative Example 1 | D | 90.6 | 1.69 | 4.83 |
| Comparative Example 2 | E | 21.2 | 0.71 | 0.10 |
| Comparative Example 3 | F | 31.4 | −0.22 | −1.75 |
| Comparative Example 4 | G | 21.7 | 0.33 | −0.56 |

The measurement results of the relative tinting strength, the L value, and the hiding power of Samples A, C, E, F, and G of the Examples and the Comparative Examples are shown in Table 3. It was found that both Samples A and C of the present invention had the relative tinting strength, the L value, and the hiding power higher than Samples F and G of Comparative Examples 3 and 4.

(1) Method for Measuring Relative Tinting Strength

Samples (A, C, E, F, and G) obtained in the Examples and the Comparative Examples and a titanium dioxide pigment (TiO$_2$) were ground by means of an agate mortar so as to come to the mass proportion of the sample to TiO$_2$ of ⅓. Then, an alkyd/melamine formulation (PVC (pigment volume concentration) 19.2%, SVC (solid content volume concentration) 45.3%) was used to prepare a coating material, which was applied on test paper for hiding power by means of an applicator. The spectral reflectance on a black base was measured in the range of 300 to 2500 nm using an ultraviolet visible near-infrared spectrometer V-670 (manufactured by JASCO Corporation). By applying the data to the Sanderson's formula described in JIS K 5101-3-3, the internal reflectance was determined to calculate K/S values. The K/S value of Comparative Example 4 (Sample G) and the K/S values of Samples A, C, E, and F were compared to calculate the relative tinting strength Kr. Each relative tinting strength is shown in Table 3 as the relative value when Comparative Example 4 (Sample G) has a relative value of 100.

(2) Method for Measuring L Value

Samples (A, C, E, F, and G) obtained by the Examples and the Comparative Examples and titanium dioxide pigment (TiO$_2$) were ground by means of an agate mortar such that the mass proportion of the sample to TiO$_2$ was ⅓. Then, an alkyd/melamine formulation (PVC (pigment volume concentration) 19.2%, SVC (solid content volume concentration) 45.3%) was used to prepare a coating material, which was applied on test paper for hiding power by means of an applicator. Then, the color of the black base surface was measured by means of colorimetric color difference meter ZE2000 (manufactured by Nippon Denshoku Industries Co., Ltd.).

(3) Method for Measuring Hiding Power

Samples (A, C, E, F, and G) obtained in the Examples and the Comparative Examples were ground by means of an agate mortar, and then an alkyd/melamine formulation (PVC (pigment volume concentration) 19.2%, SVC (solid content volume concentration) 45.3%) was used to prepare a coating material. These prepared coating materials were diluted five times with a clear resin (alkyd/melamine resin, NV40%) not containing the above filler (i.e. Samples A, C, E, F, and G), and applied on test paper for hiding power by means of a bar coater. After drying them, the Y value of the base white color (Yw) and the Y value of the base black color (Yb) in the XYZ display system are measured by means of colorimetric color difference meter ZE2000 (manufactured by Nippon Denshoku Industries Co., Ltd.) to calculate Yb/Yw as a numerical value of the contrast ratio (CR).

TABLE 3

| | Sample | Relative tinting strength Kr (%) | L value | Hiding power CR (%) |
|---|---|---|---|---|
| Example 1 | A | 177 | 38.9 | 59.6 |
| Example 3 | C | 180 | 37.8 | 64.3 |
| Comparative | E | 187 | 37.6 | 76.9 |

TABLE 3-continued

| Sample | Relative tinting strength Kr (%) | L value | Hiding power CR (%) |
|---|---|---|---|
| Example 2 Comparative Example 3 | F | 101 | 46.3 | 57.6 |
| Comparative Example 4 | G | 100 | 46.2 | 20.8 |

The powder reflectance of Samples A, C, E, F, and G obtained in the Examples and the Comparative Examples is shown in FIG. 8. From FIG. 8, it was found that Sample A of the present invention has a reflectance of 40% or more at a wavelength of 1200 nm, which is comparable to that of Sample G of Comparative Example 4 and higher than the reflectance of Sample E of Comparative Example 2 (calcium manganate). It was found that Sample C of the present invention also has a reflectance of 40% or more at a wavelength of 1200 nm, which is higher than the reflectance of Sample E of Comparative Example 2 (calcium manganate). Also, for the measurement of the reflectance, each Sample (A, C, E, F, or G) obtained in the Examples and the Comparative Examples was placed in a dedicated cell, and the spectral reflectance (reflectance of light at a wavelength of 350 to 2100 nm) was measured by means of an ultraviolet visible near-infrared spectrophotometer V-570 (manufactured by JASCO Corporation, using a Spectralon (manufactured by Labsphere Inc.) as a standard reflecting plate).

The results of the solar reflectance calculated from these data in accordance with JIS K5602 are shown in Table 4. It was found that Samples A and C of the present invention have a solar reflectance in the range of 780 to 2500 nm higher than Sample E of Comparative Example 2.

TABLE 4

| | | Solar reflectance(JIS K 5602) | | |
|---|---|---|---|---|
| | Sample | 300~2500 nm | 300~780 nm | 780~2500 nm |
| Example 1 | A | 18.8 | 6.0 | 35.0 |
| Example 3 | C | 16.0 | 6.5 | 22.5 |
| Comparative Example 2 | E | 12.0 | 6.0 | 19.5 |
| Comparative Example 3 | F | 14.3 | 8.3 | 21.9 |
| Comparative Example 4 | G | 24.0 | 6.2 | 46.5 |

It was confirmed that Samples A, B, and C obtained in Examples are powders, and thus can be blended in a solvent dispersion, a coating material, a resin composition, or a fiber composition.

INDUSTRIAL APPLICABILITY

The near-infrared reflective material of the present invention is a perovskite type composite oxide including at least an alkaline earth metal element, a titanium element, and a manganese element, and, as required, further including a Group 13 element in the periodic table, the zinc element and the like. The near-infrared reflective material, despite of its black color, has the sufficient near-infrared reflectivity, and further has excellent characteristics such as excellent hiding power and tinting strength, and thus can be used in various near-infrared reflective applications. Particularly, the near-infrared reflective material can be used for relaxation of the heat island phenomenon or the like, for example, by applying the material on roofs and outer walls of buildings, by using the material as a resin composition for films and sheets, by using the material as a fiber composition, or by applying the material on roads and pavements.

The invention claimed is:

1. A black fine particulate near-infrared reflective material of a perovskite type composite oxide represented by the following composition formula:

$$xAeTiO_{3-\gamma}yAe'MnO_{3-\gamma}zAe''(Ti_\alpha Mn_\beta)O_{3-\gamma}$$

wherein

Ae, Ae', and Ae" are each at least one alkaline earth metal element selected from magnesium, calcium, strontium, and barium, and may be the same or different from each other;

Ti represents a titanium element;

Mn represents a manganese element;

O represents an oxygen element;

x, y, and z are real numbers, $0 \leq x < 1$, $0 \leq y < 1$, $0 \leq z < 1$, and $x+y+z=1$;

$\alpha$ and $\beta$ are real numbers, $0 < \alpha < 1$ and $0 < \beta < 1$, and $\alpha + \beta = 1$; and $\gamma$ is a real number and $0 \leq \gamma < 3$; and wherein the black fine particulate near-infrared reflective material has a powder BET specific surface area in a range of 3.0 to 150 m$^2$/g, a Hunter L value of 30 or less, and a reflectance of 40% or more at a wavelength of 1200 nm.

2. The black fine particulate near-infrared reflective material according to claim 1, having a particle size in a range of 0.01 to 0.49 μm.

3. The black fine particulate near-infrared reflective material according to claim 1, having a powder BET specific surface area in a range of 3.0 to 50 m$^2$/g.

4. The black fine particulate near-infrared reflective material according to-claim 1, having a reflectance of 45% or more at a wavelength of 1200 nm.

5. The black fine particulate near-infrared reflective material according to claim 1, comprising an alkaline earth metal titanate compound and an alkaline earth metal titanate manganate compound.

6. The black fine particulate near-infrared reflective material according to claim 1, wherein the composition formula is represented by the following composition formula:

$$xAeTiO_{3-\gamma}zAe''(Ti_\alpha Mn_\beta)O_{3-\gamma}$$

7. The black fine particulate near-infrared reflective material according to claim 1, further comprising a Group 13 element in the periodic table.

8. The method for manufacturing the black fine particulate near-infrared reflective material according to claim 7, comprising:

mixing at least an alkaline earth metal compound, a titanium compound, a manganese compound, and a Group 13 element compound in the periodic table by means of a wet grinder; and firing the mixture at a temperature of 800 to 1100° C.

9. A method for manufacturing the black fine particulate near-infrared reflective material according to claim 1, comprising:

mixing at least an alkaline earth metal compound, a titanium compound, and a manganese compound by means of a wet grinder; and firing the mixture at a temperature of 800 to 1100° C.

10. The method for manufacturing the black fine particulate near-infrared reflective material according to claim 9, wherein the wet grinder includes media.

11. A solvent dispersant comprising the black fine particulate near-infrared reflective material according to claim 1.

12. A coating material comprising the black fine particulate near-infrared reflective material according to claim 1.

13. An infrared reflector comprising a base material on which the coating material according to claim 12 is applied.

14. A resin composition comprising the black fine particulate near-infrared reflective material according to claim 1.

15. A fiber composition comprising the black fine particulate near-infrared reflective material according to claim 1.

* * * * *